Sept. 30, 1969  W. F. POTTS ET AL  3,470,386
SPARK DETECTOR
Filed April 21, 1967  3 Sheets-Sheet 1

INVENTORS
WILLIAM F. POTTS.
FRANCOIS DUVAL
BY

ATTORNEY

INVENTORS
WILLIAM F. POTTS.
FRANCOIS DUVAL

ATTORNEY

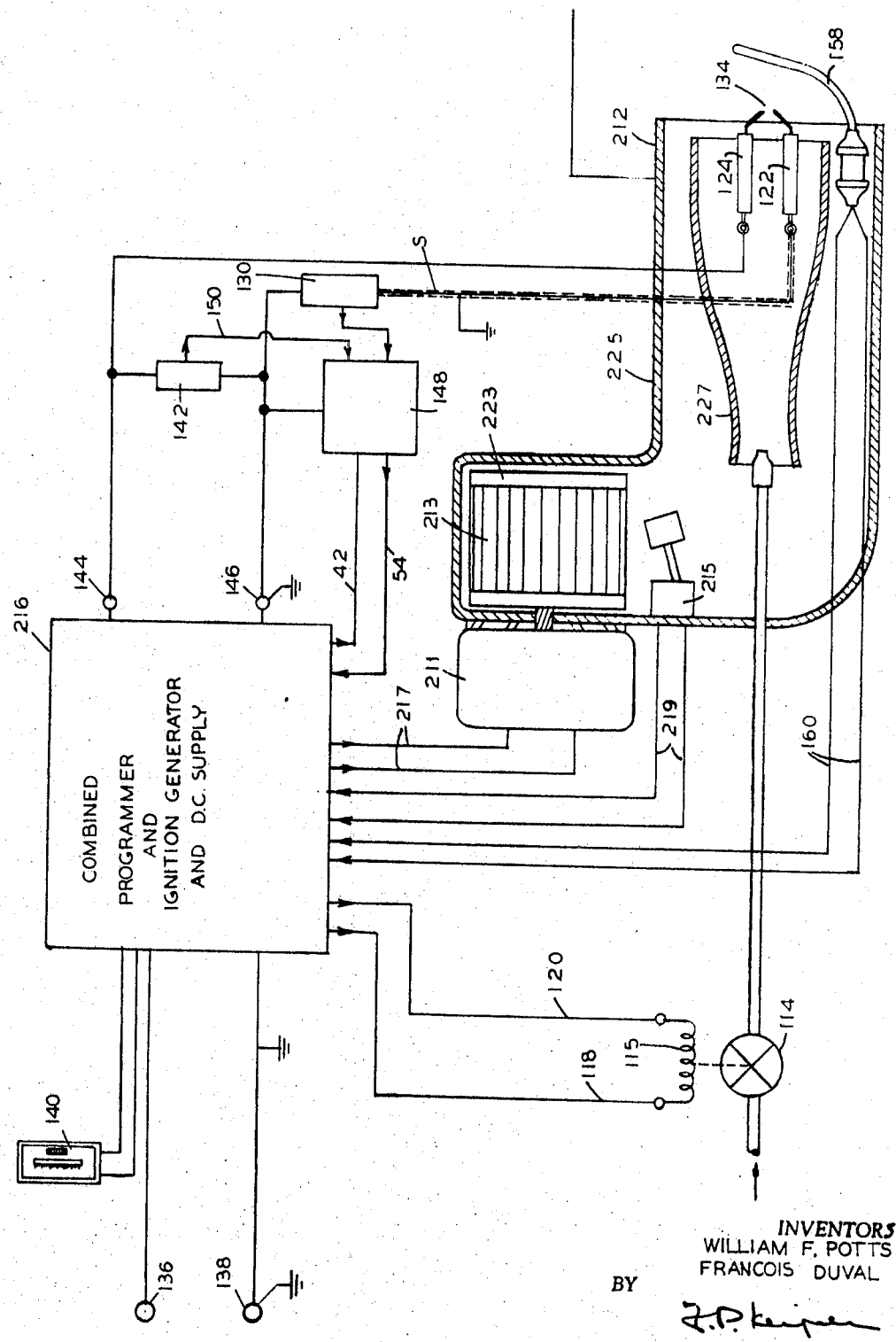

United States Patent Office 3,470,386
Patented Sept. 30, 1969

3,470,386
SPARK DETECTOR
William F. Potts, Liverpool, N.Y., and Francois Duval, Southhull, Quebec, Canada, assignors to Liberty Combustion Corporation, Syracuse, N.Y., a corporation of New York
Filed Apr. 21, 1967, Ser. No. 632,644
Int. Cl. H03k *19/22;* F23n *5/24, 1/00*
U.S. Cl. 307—218                      3 Claims

ABSTRACT OF THE DISCLOSURE

Spark occurrence signal circuit for a spark gap igniter to detect the presence or absence of a normal spark current flowing through the gap, and to detect the presence or absence of normal ignition voltage across the gap producing a signal responsive to the detection of normal current and normal voltage simultaneously, and using an AND gate.

---

This invention relates to an ignition spark detector, and more particularly to a detector for determining the actual existence of ignition sparking in an ignition spark gap.

In gas or oil burners, which are spark ignited, it is usual practice to activate the fuel supply valves simultaneously with the energization of the spark generator. It is usual, if ignition does not take place within a fixed period, to automatically cut off the fuel supply, and to require recycling. This practice is based on the assumption that with the energization of the spark generator, sparking can be presumed, and by cutting off the supply of fuel after a time interval, for failure to ignite, adequate protection is afforded.

The present invention is directed to positively and substantially instantaneously determining whether sparking occurs at the time the spark generator is energized. While the spark generator may be energized, the spark gap may be shortened by a build up of carbon, or the leads to the gap may be broken, or the insulation may have broken down. In such cases the spark generator is operating, but there is no spark. The invention is further directed to solid state circuitry that is responsive to the correct current flow in the spark gap lead, and the correct voltage across the gap, when normal sparking is occurring. The circuitry, in the absence of either the correct voltage, or correct current, or both is effective to detect the situation, and provide an output signal useful to cut off the fuel supply, or if desired, to prevent the initial opening of the fuel supply control valve.

It is an object of the invention to provide a circuit arrangement which may be used for proving the occurrence of a spark at a set of electrodes and which may be adapted for use in any of the circuit combinations disclosed in a co-pending application Ser. No. 583,032 filed Sept. 29, 1966, or in any control system which requires a means of proving the occurrence of a spark.

It is further objective of the invention to provide a two input AND gate so that both spark voltage and spark circuit must be detected before a signal output is obtained indicating the presence of a spark between a set of electrodes.

Another object of the invention is to detect spark current flow, in combination with spark voltage whereby to assure that a spark is actually occurring between the electrodes and not at some other place.

The above and other objects and novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 3 is a schematic diagram showing another environment wherein the invention may be applied.

Figure 1:
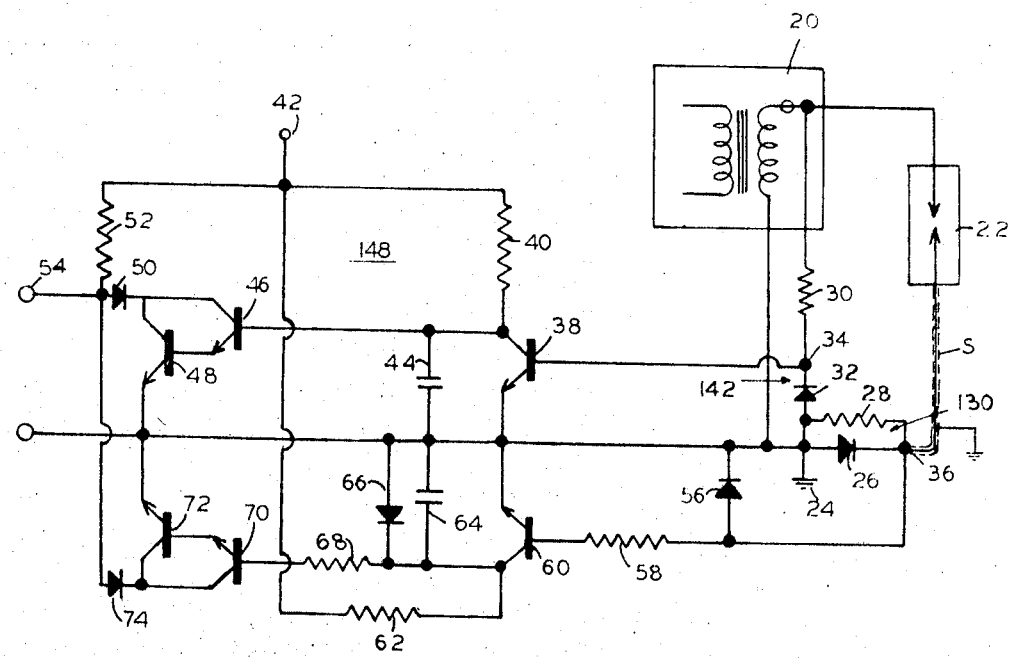
FIGURE 1 is a schematic circuit diagram illustrating apparatus according to the invention in which the output signals from the spark voltage and current detectors are connected to respective input terminals of an AND gate which has a single output.

With reference to FIGURE 1, the output of a spark voltage source such as a transformer 20 having its output terminals connected to a gap 22, one output terminal being connected direct to one electrode of the gap and the other output terminal being connected to the ground as at 24. The other electrode of the gap is connected to ground through the parallel combination of the cathode and anode in that order of a diode 26 which is in parallel connection with a resistor 28, this parallel connection of diode 26 and resistor 28, comprising a novel feature of the invention and hereinafter referred to as the spark current detector. The first mentioned output terminal of the spark voltage source is also connected to ground through the series combination of resistor 30 and cathode and anode of diode 32 in that order, resistor 30 and diode 32 comprising the spark voltage detector set forth in the aforesaid co-pending application No. 583,032. When oscillating voltage appears at the output of the spark source 20 and causes a spark to occur between the set of electrodes 22, a positive pulse will occur at reference point 34, indicating the presence of spark voltage. At the same time and because of the flow of current through the electrode gap and resistor 28 and diode 26, a positive pulse will occur at reference point 36, indicating that a current is flowing through resistor 28, thus proving that current is flowing between the electrodes. To illustrate, if the connecting wire between reference point 36 and the second mentioned electrode is broken, parted or disconnected, current cannot flow from the spark gap through the spark current detector, with the result that there will be no positive output pulse at reference point 36. As further illustration, if the electrodes of gap 22 are shorted together, only a tiny voltage will appear across the spark voltage detector and there will be no positive pulse at reference point 34. If the first electrode is grounded, there will be no positive pulse at point 34, and if the second electrode is grounded, point 36 will also be grounded and no positive pulse can occur at point 36. Thus it is only when positive pulses occur simultaneously at reference points 34 and 36 that a spark is proven to have occurred between the set of electrodes.

The output signals from points 34 and 36 are fed respectively into two amplifying pulse expanding channels having a common output. Spark voltage pulse from reference point 34 is connected to the base of an NPN transistor 38 whose emitter is connected to ground and whose collector is connected through a resistor 40 to a source DC voltage, and through a capacitor 44 to ground and directly to the base of another NPN transistor 46, in a Darlington amplifier arrangement with transistor 48. The collectors of transistors 46 and 48 are connected together and through the cathode and anode, in that order, of a diode 50, and resistor 52, to the source of DC voltage 42 and to an output terminal 54. Similarly, the spark current pulse from point 36 is fed through the attenuator network of diode 56 and resistor 58 to the base of transistor 60 whose emitter is connected to ground and whose collector is connected through resistor 62 to the DC source 42 and through capacitor 64 to ground, and through the negative pulse attenuator consisting of diode 66 and resistor 68 to the base of transistor 70 which transistor is connected in the Darlington amplifier arrangement with transistor 72, the two collectors being connected together and through the cathode anode of diode 74 to the output 54 and resistor 52 to the DC source 42. In operation, when no sparks are occurring, both transistors 38 and 60 are in the cut-off state, capacitors 44 and 64 are charged and the Darlington transistor pairs 46–48 and 70–72 are in a saturated state and the output at terminal 54 is approximately 1–2 volts and the output is considered closed. When positive pulses occur simultaneously at points 34 and 36, thus denoting the occurrence of a spark, both transistors 38 and 60 will go into saturation for the duration of the pulse thereby discharging capacitors 44 and 66 respectively and causing both Darlington transistor pairs to cut-off and so causing the voltage at output terminal 54 to be increased to the DC source voltage 42 and the output is considered open. Should one or the other or both of the positive pulses fail to occur at points 34 and 36, the respective amplifier expander channel, or both, will remain closed at the output. In this fashion the parallel amplifier expander channels form an "AND" gate whereby output at terminal 54 is not available unless positive pulses occur simultaneously at the outputs of both the spark voltage and spark current detectors, that is points 34 and 36 respectively.

The negative pulse attenuator comprised of diode 66 and resistor 68 is designed to prevent cutting-off of the transistors 70 and 72 by stray negative voltage spikes from the spark voltage source.

With reference to the operation set forth the output at terminal 54 will remain at the higher positive voltage until capacitors 44 and 64 charge through resistors 40 and 62 respectively, to a level sufficient to cause the Darlington transistor pairs 46–48 and 72–74 respectively to saturate again. In this fashion it is possible to expand the period that the output at terminal 54 remains at the higher positive voltage to many times the duration of the pulses at points 34 and 36. For instance, it is possible to keep terminal 54 positive continuously by making the charging times for capacitors 44 and 64 longer than the period between consecutive sparks.

The output at terminal 54 may actuate a relay, trigger an SCR or triac, or to provide a spark occurrence signal to additional control circuitry.

With reference to the spark current detector diode 26 and resistor 28, operation is as follows: when the spark voltage source 20 produces sufficient voltage to cause a spark to occur across the electrode gap 22, a current will flow from one output terminal of the source 20 through the connecting wire to the first electrode, through the ionized gap between the electrodes to the second electrode and the connecting wire from this latter electrode to the junction of resistor 28 and diode 26 and through these two components to ground and from ground through a connecting wire to the other output terminal of source 20 and through source 20 back to the first output terminal. Since the output of source 20 is of an oscillatory nature, the current flow will also be of an oscillatory nature. Consequently, when the first output terminal of source 20 is positive, the current will flow through resistor 28 but will not flow through the reverse connection of diode 26 and a positive voltage will occur across resistor 28, reference point 36 being positive with respect to ground and the magnitude of the voltage will be determined by the product of the current in amperes and the value of resistor 28 in ohms. When the first terminal of source 20 is negative, diode 26 will conduct with a conduction resistance much lower than that of resistor 28 and the magnitude of the negative voltage at point 36 will be limited to the conduction voltage drop across diode 26, or approximately 0.6 volt. In this fashion a positive voltage is arranged to occur at the output of the spark current detector when a current flows through the ionized spark gap. If a negative voltage output is desired instead of a positive voltage, diode 26 may be reversed to allow a negative voltage to occur having a magnitude dependent on the product of the current in amperes and the value of resistor 28 in ohms and a positive voltage limited to the forward drop of diode 26 or about 0.6 volt.

Figure 2:
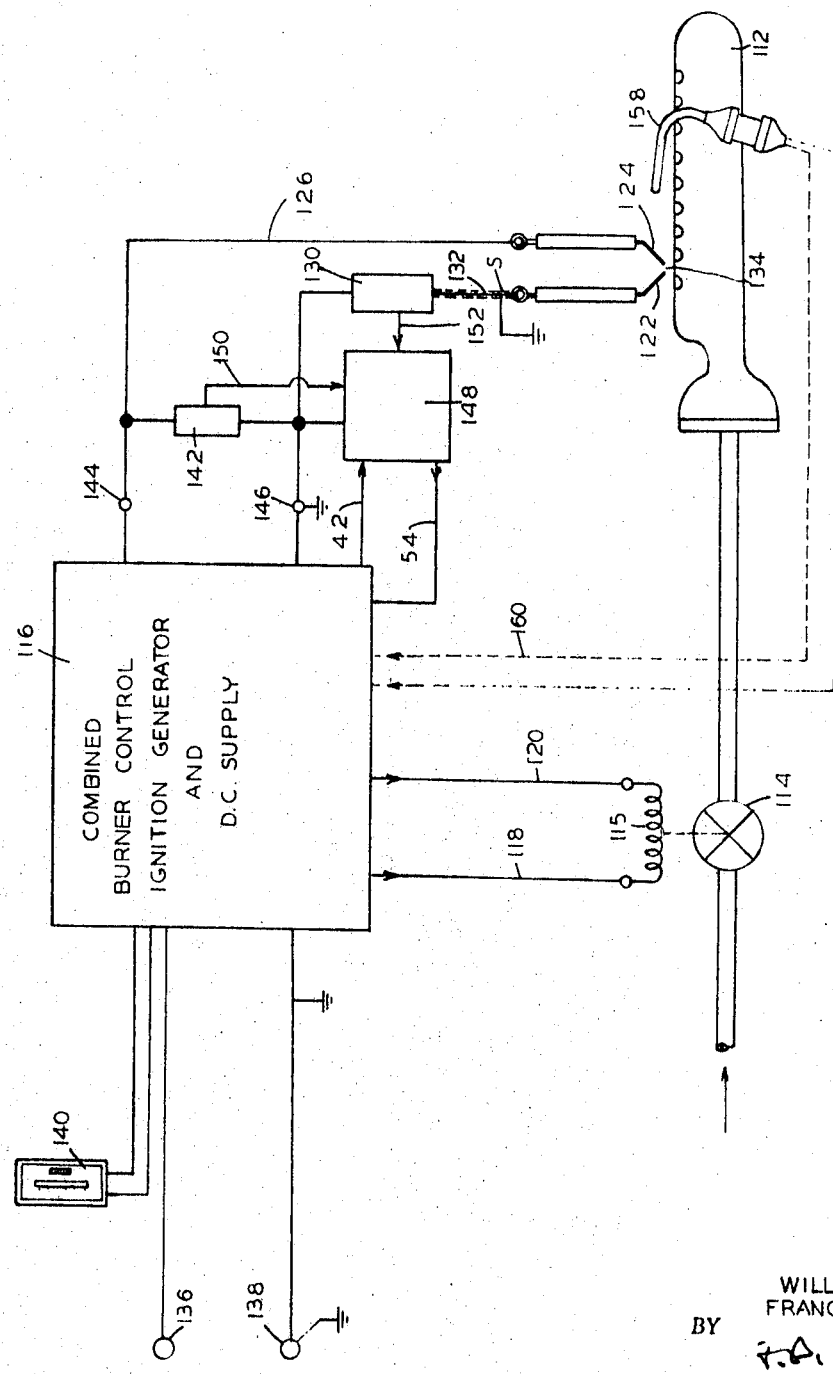
FIGURE 2 is a schematic diagram showing the one environment wherein the invention may be applied.

In FIG. 2 a gas burner 112 of the type conventionally used in fluid fuel appliances operating under atmospheric air pressures is supplied with fluid fuel of the type commercially available for domestic and industrial heating through an automatic valve 114. The valve is of conventional design.

A combined burner controller and ignition generator unit 116 for example as disclosed in application No. 583,032 is connected via leads 118 and 120 to the solenoid 115 of the valve 114. Additionally two electrodes 122 and 124 are supplied from the combined unit 116 directly via lead 126 to electrode 124 and through current detector 130 and lead 132 to electrode 122. A spark gap 134 is formed between the ends of these two electrodes to ignite the fuel from the burner 112. The alternating current power supplied to the combined unit 116 from terminals 136 and 138, the latter being grounded, is controlled by a thermostat 140 connected into the unit 116, which monitors the temperature of the medium to which the heat of the burner 112 is supplied. Thus, if the burner is used to heat water in a hot storage tank, the thermostat may be measuring water temperature. The specified thermostat arrangement by which this is accomplished is conventional and forms no part of my invention. The thermostat could be interposed between terminal 136 and unit 116. Further a voltage detector 142 is connected across the ignition generator output terminals 144 and 146, the latter being grounded, the output of this detector being connected to one input of an electronic AND Gate circuit 148 via ground connections and lead 150, and the output of current detector 130 is connected to the second input of Gate circuit 148 via ground connections and lead 152. The single output of Gate circuit 148 is connected via ground and lead 54 to combined unit 116, combined unit 116 in turn supplying a suitable direct current operating voltage to gate circuit 148 via ground and lead 42.

When heating is required, thermostat 140 connects power terminals 136 and 138 to combined unit 116, the latter in turn energizing electrodes 122 and 124 with sufficient energy to cause a spark to jump the gap 134 and ignite the fuel issuing at burner 112, and supplying DC voltage to Gate circuit 148. Combined unit 116 such as described in the copending application 583,032, is designed to energize control valve 114 only if sparks are occurring regularly at spark gap 134 as indicated by an output from Gate circuit 148, the operation of the voltage detector 142, current detector 130 and gate circuit 148 in combination to provide this output signal having been before described. In this embodiment of the invention if electrodes 122 and 124 are shorted together or either or both are short-circuited to ground, or either or both of leads 132 and 126 are disconnected in such a manner as to prevent a spark from occurring across gap 134, the output from gate circuit 148 will cease, thereby causing combined unit 116 to de-energize fuel valve 114 so that no gas can flow into burner 112. If spark gap 134 is reasonably adjusted and a spark does occur, valve 114 is energized, gas flows into burner 112 and is promptly ignited. Also in this embodiment of my invention, if the spark does not occur across the gap 134, either when ignition is attempted, or after combustion has been established, the valve 114 will be de-energized thereby preventing the escape of gas when no spark can occur.

In certain combinations of environment and burner capacity it is essential to safe burner operation to open valve 114 only after the regular occurrence of sparks at gap 134 has been proven by the output of gate circuit 148 and then to prove that combustion has been established and is continuing, proof of combustion being provided by a flame sensor 158 adjacent burner 12, sensor 158 being connected by appropriate cable 160 to combined unit 116. In this embodiment combined unit 116, such as described in the co-pending application 583,032, is designed to energize control valve 114 only if there is an output from gate circuit 148 and then only for a length of time generally referred to as the proof of ignition period, following which the ignition generator is disabled and the valve closed if combustion has not already been proven by sensor 158. If sensor 158 has proven combustion by the end of the proof of ignition period, the valve will remain energized even though sparks are not occurring but only so long as sensor 158 continues to prove the presence of combustion at burner 112 and thermostat 140 is connecting combined unit 116 to power terminals 136 and 138.

In FIGURE 3 a fluid fuel burner 212 requiring forced draft combustion air is shown inter-connected with a fuel valve 114, a combined master burner control and ignition generator unit 216 which may employ circuitry shown in application 583,032, electrodes 122 and 124, flame sensor 158, voltage detector 142, current detector 130 and AND Gate circuit 148, similar to the burner in FIGURE 2. The burner 212 in FIGURE 3 requires forced-draft combustion air and is shown, in cross-section for clarity, with an electric motor 211 driving a fan 213 which draws in combustion air at an air intake 223 and forces it through a blast tube 225 past the end of a burner venturi 227 and so out to a combustion chamber, not shown. Air flow operating a normally-open air switch 215 to a closed position thus indicating a flow of combustion air through blast tube 225. It is desirable when using this type of burner to purge residual gases from the burner combustion chamber and flue with fresh air, and furthermore it is important that means be provided to prove that the fan is in fact forcing adequate air through the blast tube 225. Thus the combined unit 216, employed in the embodiment of the invention, provides the additional functions of causing only the motor 211 and fan 213 to operate for a pre-purge period while delaying ignition and opening of valve 114 until the pre-purge period has ended, yet keeping motor 211 running during the entire combustion cycle, even providing when necessary the further function of keeping motor 211 operating after the combustion cycle has ended for a definite interval which may be referred to as a post-purge period. Electrical cables 217 and 219 provide the necessary interconnections between motor 11 and air switch 215 respectively, and the combined unit 216. When heating is required, thermostat 140 connects power terminals 36 and 38 to the circuits of unit 216 which simultaneously supplies power to motor 211, DC operating voltage to gate circuit 148, and starts its own integrally located pre-purge period timer. Air switch 215 is interconnected with the control section of unit 216 so that it must be operated by air-flow, to the closed position in order for subsequent functions to take place after the end of the pre-purge period. When the pre-purge period ends, combined unit 216 energizes electrodes 122 and 124 sufficiently to cause a spark to jump spark gap 134, and when sparks are occurring regularly as previously described the output of gate circuit 148 will signal combined unit 216 to energize and open fuel valve 114 to allow fuel to flow into venturi 227 to be ignited by the sparks where the fuel issues from the venturi 227. The combined unit 216 may be designed to energize valve 114 only as long as gate circuit 148 has an output thus proving the occurrence of sparks at gap 134 as previously described. Alternatively, and also as previously described, the burner may be equipped with a flame sensor 158, interconnected by electrical cable 160 to combined unit 216, combined unit 216 being designed in this case so that at the end of the pre-purge period a proof of ignition period begins during which the opening of valve 114 is first dependent upon combined unit 216 receiving an output signal from gate circuit 148, remaining dependent upon such signal if the fuel fails to ignite until the end of the proof of ignition period at which time the system will lock-out. The valve 114 is secondly dependent thereupon after the ending of the proof of ignition period. In this fashion combustion is maintained until thermostat 140 disconnects power from the circuits of unit 216. In the event that combustion is interrupted during a combustion cycle, the sensor 158 will detect the absence of combustion and will cause the combined unit 216 to go into lock-out.

The combined unit 216 may be designed, if desired so that when either thermostat 140 opens or lock-out occurs only motor 211 and 213 will continue to operate during the post-purge period.

If the post-purge period be not required, the thermostat could be used to control the supply of power from terminal 136 to unit 216.

Due to the sensitivity of the transistor 60 it is desirable to shield the lead between the reference point 36 and the corresponding electrode, in FIGURE 2, or the corresponding lead between the current detector 130, and electrode 122 in FIGURES 2 and 3, the shield being grounded and as indicated at S in each figure. Thus apparent spark current signals caused by the very high voltage of the transformer secondary 20 acting through stray capacitance, are avoided.

While a single form of the invention applied to several circuits has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A spark occurrence signal circuit for a spark igniter having gap electrodes comprising current detection means to detect the presence or absence of a normal spark current flowing through the electrodes, voltage detection means to detect the presence or absence of normal ignition voltage across said electrodes, and signal producing means responsive to each of said current detection means and said voltage detection means for producing a signal only when the current detection means and the voltage detection means detect the presence simultaneously of normal spark current, and normal electrode voltage respectively.

2. A spark occurrence signal circuit according to claim 1 wherein the signal producing means includes an AND gate.

3. A spark occurrence signal circuit according to claim 1, wherein the circuitry between the current detection means and the corresponding gap electrode is provided with grounded shielding to prevent spurious signals from affecting the signal producing means.

References Cited

UNITED STATES PATENTS

| 1,755,390 | 4/1930  | Fischer et al. | 431—66 |
| 2,358,166 | 9/1944  | Isserstedt     | 431—66 |
| 2,444,239 | 6/1948  | Aubert et al.  | 431—66 |
| 2,675,069 | 4/1954  | Shottenfeld    | 431—66 |
| 3,287,574 | 11/1966 | Jenkins        | 307—218 X |

FREDERICK L. MATTESON, Jr., Primary Examiner

R. A. DUA, Assistant Examiner

U.S. Cl. X.R.

123—148; 315—209; 431—66